(12) United States Patent
Cassidy et al.

(10) Patent No.: US 8,404,157 B2
(45) Date of Patent: Mar. 26, 2013

(54) METHODS AND COMPOSITIONS FOR INHIBITING CORROSION

(75) Inventors: Juanita M. Cassidy, Duncan, OK (US); Chad E. Kizer, Comanche, OK (US); Anupon Sabhapondit, Pune (IN)

(73) Assignee: Halliburton Energy Services, Inc., Duncan, OK (US)

( * ) Notice: Subject to any disclaimer, the term of this patent is extended or adjusted under 35 U.S.C. 154(b) by 207 days.

(21) Appl. No.: 12/711,422

(22) Filed: Feb. 24, 2010

(65) Prior Publication Data

US 2011/0155959 A1  Jun. 30, 2011

(30) Foreign Application Priority Data

Dec. 30, 2009 (IN) ............... 2735/DEL/2009

(51) Int. Cl.
*C23F 11/04* (2006.01)
*C23F 11/14* (2006.01)
*C23F 11/00* (2006.01)
*C23F 11/10* (2006.01)
*C09K 15/00* (2006.01)
*C09K 15/16* (2006.01)

(52) U.S. Cl. ............... 252/394; 106/14.05; 106/14.11; 106/14.15; 252/387

(58) Field of Classification Search ............... 252/394, 252/387; 106/14.05, 14.11, 14.15
See application file for complete search history.

(56) References Cited

U.S. PATENT DOCUMENTS

| 3,094,490 A | * | 6/1963 | Gardner et al. | ............... 252/391 |
| 5,120,356 A | * | 6/1992 | Phillips et al. | ............... 106/14.16 |
| 6,818,313 B2 | * | 11/2004 | Phelps et al. | ............... 428/457 |

FOREIGN PATENT DOCUMENTS

| GB | 1434354 | * | 8/1972 |
| WO | WO2005054544 | * | 6/2005 |

OTHER PUBLICATIONS

Desai et al. Schiff Bases as Corrosion Inhibitors for Mild Steel in Hydrochloric Acid Solutions. May 1986 Corrosion Science. vol. 26, No. 10 pp. 827-837.*
Halliburton. HAI-303. Jun. 2008.*

* cited by examiner

*Primary Examiner* — Harold Y Pyon
*Assistant Examiner* — Tanisha Diggs
(74) *Attorney, Agent, or Firm* — Robert A. Kent; McDermott Will & Emery LLP

(57) ABSTRACT

Of the many methods provided herein, a method comprising: (a) combining a corrosion inhibitor composition with an aqueous acid solution, the corrosion inhibitor composition comprising a benzylideneaniline compound corresponding to Formula 1 below:

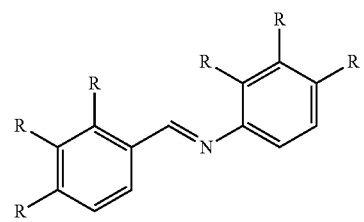

Formula 1 wherein R is H, methyl, ethyl, hydroxy, methoxy, ethoxy, bromo, chloro, fluoro, mercapto, dimethylamino, or diethylamino groups and/or a cinnamylideneaniline compound corresponding to Formula 2 below:

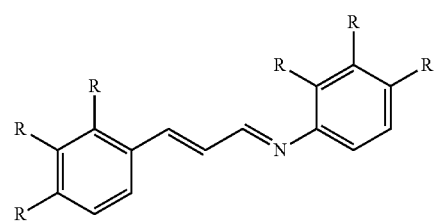

Formula 2 wherein R is H methyl, ethyl, hydroxy, methoxy, ethoxy, bromo, chloro, fluoro, mercapto, dimethylamino, or diethylamino groups; and contacting a metal surface with the aqueous acid solution.

9 Claims, No Drawings

METHODS AND COMPOSITIONS FOR INHIBITING CORROSION

CROSS-REFERENCE TO RELATED APPLICATION(S)

This application claims priority to Indian patent application No. 2735/DEL/2009 filed with the Indian Intellectual Property Office on Dec. 30, 2009, the entire application of which is hereby incorporated by reference.

BACKGROUND

The present invention relates to methods of inhibiting the corrosion of metal surfaces by aqueous acids and corrosion inhibitor compositions comprising a benzylideneaniline compound and/or a cinnamylideneaniline compound.

Subterranean hydrocarbon containing formations penetrated by well bores are often treated with aqueous acids to stimulate the production of hydrocarbons therefrom. One such treatment, generally referred to as "acidizing," involves the introduction of an aqueous acid solution into a subterranean formation under pressure so that the acid solution flows through the pore spaces of the formation. The acid reacts with acid soluble materials contained in the formation thereby increasing the size of the pore spaces, thus increasing the permeability of the formation. Another production stimulation treatment known as "fracture-acidizing" involves the formation of one or more fractures in the formation and the introduction of an aqueous acid solution into the fractures to etch the fracture faces whereby channels are formed therein when the fractures close. The acid also enlarges the pore spaces in the fracture faces and in the formation.

Acidizing and fracture-acidizing solutions typically contain, for example, 15% to 28% hydrochloric acid, which can cause corrosion of metal surfaces in pumps, tubular goods and equipment used to introduce the aqueous acid solutions into the subterranean formations to be treated. The expense associated with repairing or replacing corrosion damaged tubular goods and equipment can be problematic. The corrosion of tubular goods and down-hole equipment is increased by the elevated temperatures encountered in deep formations, and the corrosion results in at least the partial neutralization of the acid before it reacts with acid-soluble materials in the formations, which leads to added expense and complications because additional quantities of the acid often are required to achieve the desired result.

Aqueous acid solutions are also utilized in a variety of other industrial applications to contact and react with acid soluble materials. In such applications, metal surfaces are contacted with the acid and any corrosion of the metal surfaces is highly undesirable. In addition, other corrosive fluids such as aqueous alkaline solutions, heavy brines, petroleum streams containing acidic materials and the like are commonly transported through and corrode metal surfaces in tubular goods, pipelines and pumping equipment.

A variety of metal corrosion inhibiting additives has been developed for aqueous acid fluids; however, many of them are considered environmentally objectionable. Cinnamaldehyde, which has favorable environmental characteristics, has been used for years in corrosion inhibitor formulations; however, the cinnamaldehyde molecule by itself provides only limited inhibition in 15% hydrochloric acid at temperatures greater than 225° F. and in 28% hydrochloric acid at temperatures greater than 200° F. Since cinnamaldehyde is one of the more ecologically benign organic materials in acid corrosion inhibitor compositions, improvements in cinnamaldehyde-based chemistry are actively pursued.

Some improvements have been made to the corrosion inhibiting properties of cinnamaldehyde by combining it with aniline, for example. Such compositions, however, can exhibit solubility issues in acidic fluids. Moreover, in some instances, these compositions may not meet current regulatory guidelines for use in certain areas such as the North Sea. Benzaldehyde has been used in some corrosion inhibitor compositions with cinnamaldehyde. Benzaldehyde, although an aldehyde, is not alpha-beta unsaturated, and therefore, does not provide desirable corrosion resistance. This may be due to the electronic effects imparted by the alpha-beta unsaturated moiety, which are believed to be sites for initiation of polymerization at the surface, or for chemisorption to the metal surface.

SUMMARY

The present invention relates to methods of inhibiting the corrosion of metal surfaces by aqueous acids and corrosion inhibitor compositions comprising a benzylideneaniline compound and/or a cinnamylideneaniline compound.

In one embodiment, the present invention provides a method comprising: combining a corrosion inhibitor composition with an aqueous acid solution, the corrosion inhibitor composition comprising a benzylideneaniline compound corresponding to Formula 1 below:

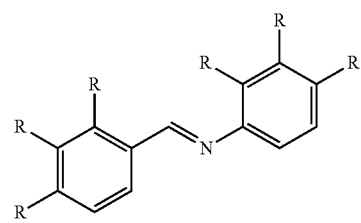

Formula 1 wherein R is H, methyl, ethyl, hydroxy, methoxy, ethoxy, bromo, chloro, fluoro, mercapto, dimethylamino, or diethylamino groups, and/or a cinnamylideneaniline compound corresponding to Formula 2 below:

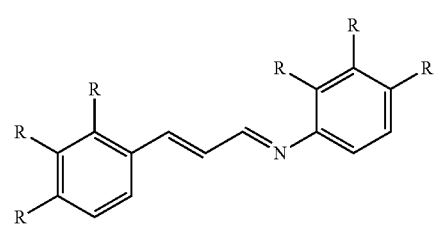

Formula 2 wherein R is H, methyl, ethyl, hydroxy, methoxy, ethoxy, bromo, chloro, fluoro, mercapto, dimethylamino, or diethylamino groups; and contacting a metal surface with the aqueous acid solution.

In another embodiment, the present invention provides a corrosion inhibitor composition for inhibiting the corrosion of metal surfaces by an aqueous acid solution when the composition is added to the aqueous acid solution comprising a benzylideneaniline compound corresponding to Formula 1 below:

Formula 1

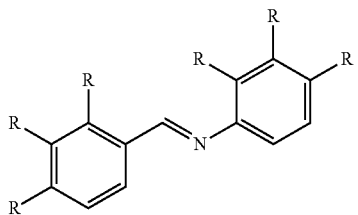

wherein R is H, methyl, ethyl, hydroxy, methoxy, ethoxy, bromo, chloro, fluoro, mercapto, dimethylamino, or diethylamino groups, and/or a cinnamylideneaniline compound corresponding to Formula 2 below:

Formula 2

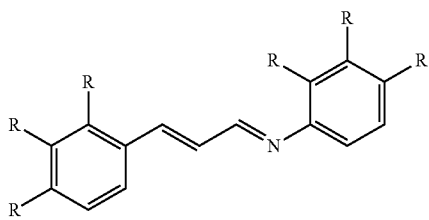

wherein R is H, methyl, ethyl, hydroxy, methoxy, ethoxy, bromo, chloro, fluoro, mercapto, dimethylamino, or diethylamino groups.

In another embodiment, the present invention provides a metal corrosion inhibited aqueous acid composition comprising: an aqueous fluid; an acid selected from the group consisting of hydrochloric acid, acetic acid, formic acid, hydrofluoric acid and mixtures thereof; and a corrosion inhibitor composition comprising a benzylideneaniline compound corresponding to Formula 1 below:

Formula 1

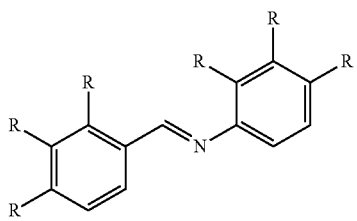

wherein R is H, methyl, ethyl, hydroxy, methoxy, ethoxy, bromo, chloro, fluoro, mercapto, dimethylamino, or diethylamino groups, and/or a cinnamylideneaniline compound corresponding to Formula 2 below:

Formula 2

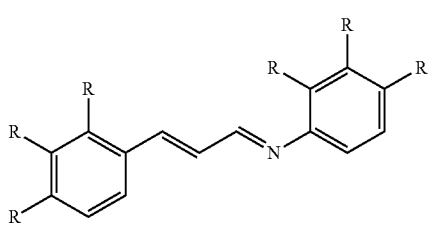

wherein R is H, methyl, ethyl, hydroxy, methoxy, ethoxy, bromo, chloro, fluoro, mercapto, dimethylamino, or diethylamino groups.

The features and advantages of the present invention will be readily apparent to those skilled in the art. While numerous changes may be made by those skilled in the art, such changes are within the spirit of the invention.

DETAILED DESCRIPTION

The present invention relates to methods of inhibiting the corrosion of metal surfaces by aqueous acids and corrosion inhibitor compositions comprising a benzylideneaniline compound and/or a cinnamylideneaniline compound.

One of the many advantages associated with the corrosion inhibitor compositions of the present invention (many of which are not discussed or alluded to herein) is that they have the potential to be used as corrosion inhibitors in locations that are subject to environmental regulations, such as the North Sea. A component of the corrosion inhibitor compositions of the present invention comprises a benzylideneaniline compound and/or a cinnamylideneaniline compound, which may be considered "yellow" under current (as of the time of filing) Norwegian environmental standards. The corrosion inhibitor compositions show performance in 28% HCl, whereas current "yellow" formulations that do not. An effective "yellow" corrosion inhibitor for 28% HCl is very desirable. In some instances, the corrosion inhibitor compositions of the present invention meet performance requirements of 28% HCl, at 200° F. for 24 hours on 13Cr-L80, N-80, and 25Cr and yellow environmental criteria.

The corrosion inhibitor compositions of the present invention comprise N-benzylideneaniline. Benzylideneaniline can be formed by a reaction comprising benzaldehyde and aniline. The chemical structure is:

Formula 1

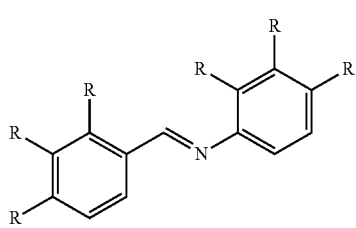

wherein R is H, methyl, ethyl, hydroxy, methoxy, ethoxy, bromo, chloro, fluoro, mercapto, dimethylamino, or diethylamino groups.

Its current CAS Registry Number is 538-51-2, and its current EINECS is 208-694-9. It is available from at least Beijing Hengye Zhongyuan Chemical Co., Ltd. China. U.S. Pat. No. 2,185,854 teaches methods of forming benzylideneaniline, and the disclosure of which is hereby incorporated by reference.

In addition to or alternative to benzylideneaniline, cinnamylideneaniline may be used, the formula of which is shown in Formula 2 below:

Formula 2

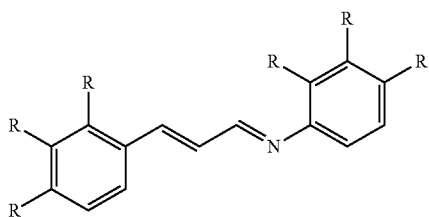

wherein R is H, methyl, ethyl, hydroxy, methoxy, ethoxy, bromo, chloro, fluoro, mercapto, dimethylamino, or diethylamino groups. Cinnamylideneaniline may be formed from a reaction comprising cinnamaldehyde and aniline.

The methods of this invention for inhibiting the corrosion of metal surfaces by an aqueous acid solution comprise the steps of combining a corrosion inhibitor composition with the aqueous acid solution and then contacting the metal surfaces with the aqueous acid solution containing the corrosion inhibitor composition. The corrosion inhibitor composition comprises a benzylideneaniline compound and/or a cinnamylideneaniline compound. The corrosion inhibitor composition can be formulated before combining it with the aqueous acid solution, or can be formed in situ in the composition by combining and reacting benzaldehyde and aniline.

The metals that can be protected from corrosion by the corrosion inhibiting methods and compositions of this invention include, but are not limited to, steel grade N-80, J-55 P-110, QT800, HS80, and other common oil field alloys such as 13Cr, 25Cr, Incoloy 825 and 316L.

The corrosion inhibitor composition can also include an iodide source such as potassium iodide, sodium iodide, and iodine, solvents such as methanol, isopropanol, 2-ethyl-1-hexanol, ethylene glycol, propylene glycol, diethylene glycol, glycol ethers, and surfactants such as linear alcohol ethoxylates, amine alcohol ethoxylates, and ethoxylated amides.

Preferably, the corrosion inhibitor composition is combined with the aqueous acid solution in an amount in the range of from about 0.01% to about 8% by volume of the aqueous acid solution, and more preferably from about 0.1% to about 5%.

As mentioned, the acids in the aqueous acid solutions in which the corrosion inhibiting methods and compositions of this invention are particularly effective include, but are not limited to, hydrochloric acid, acetic acid, formic acid, hydrofluoric acid, and mixtures of the acids. Preferably, the aqueous acid solution comprises an acid or mixture of acids in an amount up to about 32% by weight thereof. More preferably, the acid is hydrochloric acid present in the aqueous acid solution in an amount in the range of from about 5% to about 28% by weight thereof.

In practice, corrosion rates generally tend to increase with increasing acid concentration and with increasing temperature. While aldehydes and ketones provide only limited corrosion protection in 15% hydrochloric acid at temperatures higher than 225° F. and in 28% hydrochloric acid at temperatures higher than 200° F., the corrosion inhibitor compositions of the present invention significantly improved corrosion inhibition of metal surfaces under the above mentioned conditions. Generally, the corrosion inhibitor compositions of this invention are effective at hydrochloric acid concentrations of 28% up to about 250° F. to about 275° F.

As also mentioned, the corrosion inhibitor compositions of this invention may also include a surfactant for dispersing the benzylideneaniline compound and/or a cinnamylideneaniline compound in a corrosive aqueous fluid. Examples of suitable such dispersing surfactants are alkyoxylated fatty acids, alkylphenol alkoxylates, ethoxylated amides and ethoxylated alkyl amines. Also suitable are EO/PO block copolymer surfactants. When a dispersing surfactant of the type described above is utilized in a corrosion inhibitor composition of this invention, it is generally present in the composition in an amount in the range of from about 1% to about 45% by weight of the composition.

Another component, which can be included in the corrosion inhibitor compositions, is a mutual solvent. Examples of such solvents are methyl alcohol, ethyl alcohol, isopropyl alcohol, ethylene glycol, propylene glycol, dimethyl formamide, N-methyl pyrrolidone, propylene glycol methyl ether and butyl cellosolve. When a mutual solvent of the type described above is included in a corrosion inhibitor composition of this invention, it is generally present in an amount in the range of from about 1% to about 40% by weight of the composition.

In addition, the corrosion inhibitor compositions can include one or more quaternary ammonium compounds, one or more corrosion inhibitor activators and other components commonly utilized in corrosion inhibiting formulations such as acetylenic alcohols, Mannich condensation products formed by reacting an aldehyde, a carbonyl containing compound and a nitrogen containing compound, unsaturated carbonyl compounds, unsaturated ether compounds, formamide, formic acid, formates, other sources of carbonyl, iodides, terpenes, and aromatic hydrocarbons.

The quaternary ammonium compounds which function as corrosion inhibitors and can be utilized in accordance with the present invention have the general formula:

$$(R)_4N^+X^-$$

wherein each R is the same or a different group selected from long chain alkyl groups, cycloalkyl groups, aryl groups or heterocyclic groups, and X is an anion such as a halide. The term "long chain" is used herein to mean hydrocarbon groups having in the range of from about 12 to about 20 carbon atoms. Examples of quaternary ammonium compounds which can be included in the corrosion inhibitor compositions of this invention are N-alkyl, N-cycloalkyl and N-alkylarylpyridinium halides such as N-cyclohexylpyridinium bromide or chloride, N-alkyl, N-cycloalkyl and N-alkylarylquinolinium halides such as N-dodecylquinolinium bromide or chloride, and the like. When a quaternary ammonium compound is included in a composition of this invention, it is generally present in an amount in the range of from about 1% to about 45% by weight of the composition.

Corrosion inhibitor activators function to activate corrosion inhibitor components such as quaternary ammonium compounds so that they function as corrosion inhibitors. Examples of such corrosion inhibitor activators which can be utilized are cuprous iodide; cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid; and mixtures of the foregoing activators such as a mixture of formic acid and potassium iodide. When a corrosion inhibitor activator is included in a composition of this invention, it is generally present in an amount in the range of from about 0.1% to about 5.0% by weight of the composition.

In one embodiment, the present invention provides a method comprising: (a) combining a corrosion inhibitor composition with an aqueous acid solution, the corrosion inhibitor composition comprising a benzylideneaniline compound corresponding to Formula 1 below:

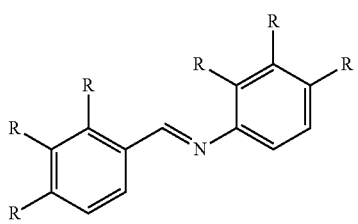

Formula 1 wherein R is H, methyl, ethyl, hydroxy, methoxy, ethoxy, bromo, chloro, fluoro, mercapto, dimethylamino, or diethylamino groups and/or a cinnamylideneaniline compound corresponding to Formula 2 below:

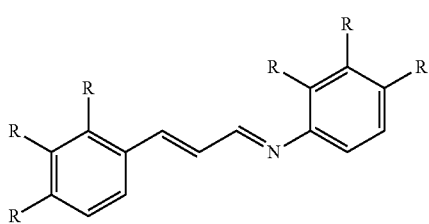

Formula 2 wherein R is H, methyl, ethyl, hydroxy, methoxy, ethoxy, bromo, chloro, fluoro, mercapto, dimethylamino, or diethylamino groups; and (b) contacting a metal surface with the aqueous acid solution.

In one embodiment, the present invention provides a method comprising: (a) combining a corrosion inhibitor composition with an aqueous acid solution, the corrosion inhibitor composition comprising a benzylideneaniline compound and/or a cinnamylideneaniline compound; and (b) contacting a metal surface with the aqueous acid solution.

In one embodiment, the present invention provides a method comprising: (a) combining a corrosion inhibitor composition with an aqueous acid solution, the corrosion inhibitor composition comprising a benzylideneaniline compound and/or a cinnamylideneaniline compound; (b) contacting a metal surface with the aqueous acid solution; and (c) allowing a benzylideneaniline compound and/or a cinnamylideneaniline compound to interact with the acid so as to inhibit corrosion of the metal surface.

To facilitate a better understanding of the present invention, the following examples of certain aspects of some embodiments are given. In no way should the following examples be read to limit, or define, the entire scope of the invention.

EXAMPLE

Weight loss tests are performed by first cleaning the alloy specimen by degreasing with acetone followed by removal of surface scale by lightly beadblasting the surface. The alloy, of approximate surface area 4.4 in$^2$ is weighed and placed into 100 mL of the test fluid in a glass container. The container with test fluid and specimen is placed in an autoclave, which is closed, then pressurized with nitrogen to 1000 psi and finally heated to test temperature. The test duration is total test fluid contact time on the specimen. Test fluids are prepared with mixing throughout, by adding the additives to aqueous fluid followed by addition of the appropriate amount of concentrated HCl to give the desired acid strength. Benzylideneaniline can be prepared by stirring together benzaldehyde and aniline in a 1:1 molar ratio. The resulting solid is used unpurified. Alternately, benzylideneaniline can be purchased in its pure form. At the end of the test time the coupon is removed from the test fluid and is cleaned with acetone and a light brushing to remove surface deposits, and is dried and weighed. Results tested in 28% HCl are shown in Table 1.

TABLE 1

| Temp. °F. | Time (hr) | Additive | Additive | Additive | Corrosion Loss (lb/ft$^2$) 13Cr-L80 | Corrosion Loss (lb/ft$^2$) N-80 | Corrosion Loss (lb/ft$^2$) SM25CRW-125 |
|---|---|---|---|---|---|---|---|
| 200 | 24 | 2.11 wt % benzylideneaniline | 2% HAI-303 | 30 lb/M HII-124B | 0.0474 | 0.0255 | 0.016 |
| 200 | 24 | 4.22 wt % benzylideneaniline | — | 60 lb/M HII-124B | 0.044 | | |
| 250 | 3 | — | 2% HAI-303 | — | | 0.573 | |
| 250 | 3 | — | 2% HAI-303 | 30 lb/M HII-124B | | 0.355 | |
| 250 | 3 | 2.11 wt % benzylideneaniline | 2% HAI-303 | 30 lb/M HII-124B | 0.0439 | 0.0336 | 0.0044 |
| 250 | 3 | 3.16 wt % benzylideneaniline | — | 60 lb/M HII-124B | 0.0334 | | |
| 250 | 3 | 4.22 wt % benzylideneaniline | — | 30 lb/M HII-124B | 0.087 | | |
| 250 | 3 | 4.22 wt % benzylideneaniline | — | 60 lb/M HII-124B | 0.038 | | |

In at least some respects, Table 1 shows that benzylideneaniline functions in conjunction with currently available North Sea HCl inhibitors, "HAI-303." Surprisingly, it also gives an acceptable corrosion loss when used without the formulated inhibitor, but with a commercially available intensifier, "HII-124B." Both "HAI-303" (which is cinnamaldehyde-based corrosion inhibitor) and "HII-124B" (which is an acid inhibitor intensifier) are available from Halliburton Energy Services, Inc. in Duncan, Okla.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. In addition, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   (a) combining a corrosion inhibitor composition with an aqueous acid solution, the corrosion inhibitor composition comprising benzylideneaniline, cinnamylideneaniline, and an optional iodide source;
   wherein the benzylideneaniline and the cinnamylideneaniline are each present in the corrosion inhibitor composition at a concentration ranging between about 0.1 to about 1 percent by weight of the aqueous acid solution; and
   wherein the aqueous acid solution comprises hydrochloric acid; and
   (b) contacting a metal surface with the aqueous acid solution.

2. The method of claim 1, wherein the iodide source is present.

3. The method of claim 2, wherein the iodide source is selected from the group consisting of sodium iodide, potassium iodide, and iodine.

4. The method claim 1, wherein the metal surface comprises a composition selected from the group consisting of J55 steel, N-80 steel, 13Cr alloy, 25Cr alloy, and 316L.

5. The method of claim 1, wherein the corrosion inhibitor composition further comprises one or more of a quarternary ammonium source, a solvent, or a surfactant.

6. The method of claim 1, wherein the aqueous acid solution further comprises acetic acid, formic acid, hydrofluoric acid, and mixtures thereof.

7. The method of claim 1, wherein the hydrochloric acid being present in an amount in the range of about 5% to about 28% by weight of aqueous acid solution.

8. The method of claim 1, wherein the aqueous acid solution contacts the metal surface at temperatures up to about 300° F.

9. The method of claim 1, wherein the corrosion inhibitor composition further comprises a corrosion inhibitor activator.

* * * * *